United States Patent [19]

Wilkes

[11] 3,763,426
[45] Oct. 2, 1973

[54] METHOD AND APPARATUS FOR TESTING TWISTED PAIR WIRE TO LOCATE ELECTRICAL INSULATION FAULTS OR MEASURE TWIST OR WIRE RUNOUT OR SENSE BREAKS IN THE CONDUCTORS

[75] Inventor: Richard B. Wilkes, Danbury, Conn.

[73] Assignee: Hipotronics, Inc., Brewster, N.Y.

[22] Filed: Mar. 7, 1972

[21] Appl. No.: 232,564

[52] U.S. Cl. .................................. 324/54, 324/52
[51] Int. Cl. ....................... G01r 31/08, G01r 31/12
[58] Field of Search .......................... 324/51, 52, 54; 140/149

[56] References Cited
UNITED STATES PATENTS

| | | | |
|---|---|---|---|
| 887,441 | 5/1908 | Swank | 140/149 UX |
| 2,635,136 | 4/1953 | Duffy | 324/54 |
| 2,942,181 | 6/1960 | Edwards et al. | 324/54 |
| 2,980,851 | 4/1961 | Henning | 324/54 X |
| 2,994,820 | 8/1961 | Brown | 324/54 |
| 3,096,478 | 7/1963 | Brown | 324/54 |
| 3,277,365 | 10/1966 | Doran | 324/54 |
| 3,628,133 | 12/1971 | Dornberger | 324/52 |

FOREIGN PATENTS OR APPLICATIONS

| | | | |
|---|---|---|---|
| 760,040 | 10/1953 | Germany | 324/54 |
| 914,413 | 7/1954 | Germany | 324/54 |

*Primary Examiner*—Gerard R. Strecker
*Attorney*—Roland T. Bryan et al.

[57] ABSTRACT

A twisted pair of individually insulated wires is rapidly and reliably tested for electrical faults in a testing apparatus which separates the twisted pair of wires for continuous testing of the individual wires as a length of the twisted pair wire is drawn through the testing apparatus. The testing apparatus comprises a support member providing a passage along a feed axis for said twisted pair and an electrode unit mounted in the support member for free rotation about said axis. The electrode unit includes a separating member lying on said axis and arranged to fit between the twisted pair of wires to follow the twist of said twisted pair as it is fed along said axis so as to continuously remain between the twisted pair of wires and permit continuous separate testing of the individual wires. Electrode units of several different configurations are usable: In one electrode unit, the separating member fitting between the twisted pair of wires comprises an insulating sheet and conductive members on each side of the sheet for contacting the individual wires of the twisted pair. In other electrode units, the separating member fitting between the twisted pair of wires is designed to release when a kink or knot occurs in the wire, and in still other electrode units, the separating member fitting between the wires may be a solid conductor or a solid insulator with other electrode portions lying adjacent the individual wires. In each such testing apparatus, means are provided for making electrical contact with the electrode unit as it rotates, to enable connection to an indicating or control circuit. By means of such testing apparatus, twisted pair wire may be tested for pinholes, bare wire, and coincidence faults. By including means sensitive to rotation of the electrode unit, the detection of wire runout is achieved. In one testing system, two such testing apparatuses are axially separated on the same twisted pair wire, to detect open circuits in the wires by measuring capacitance in the length of wire between the two electrode units, and to measure the amount of twist per unit length of wire by measuring the phase angle between the two rotating electrode units in relation to their axial separation.

36 Claims, 18 Drawing Figures

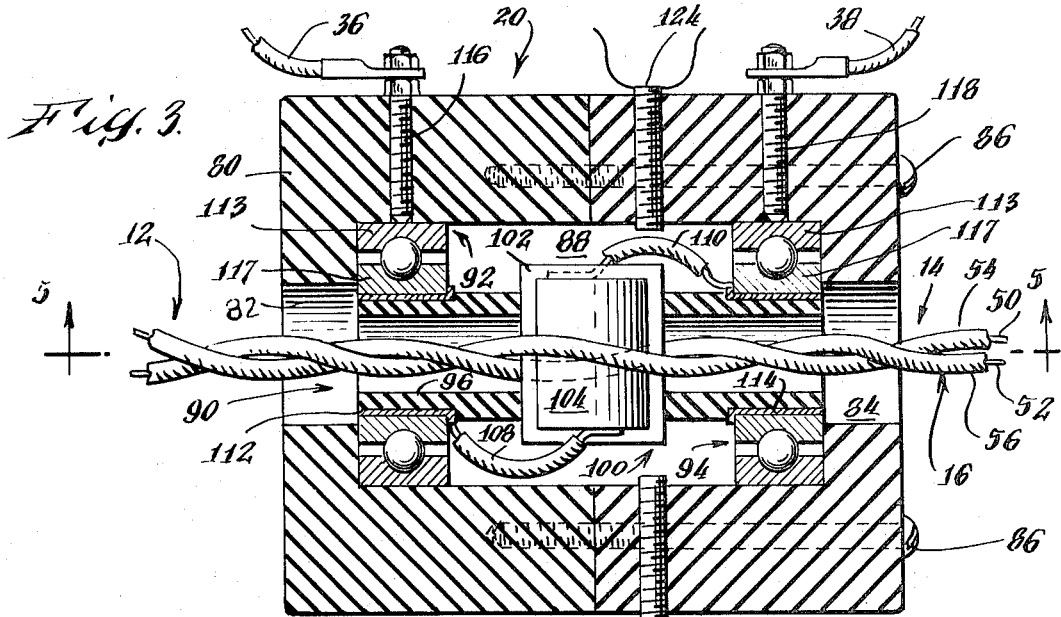
Fig. 3.
Fig. 4.
Fig. 5.
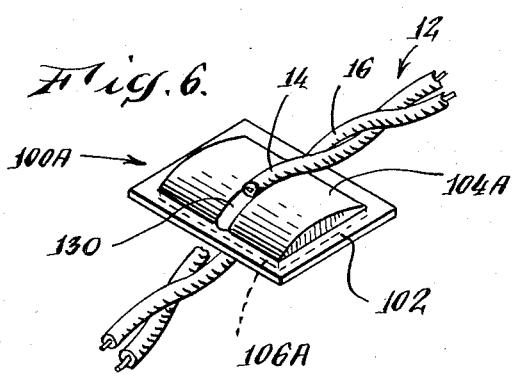
Fig. 6.
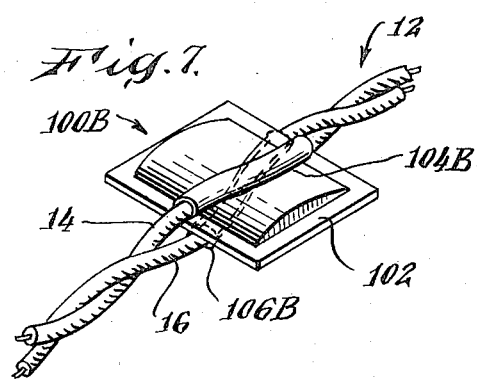
Fig. 7.

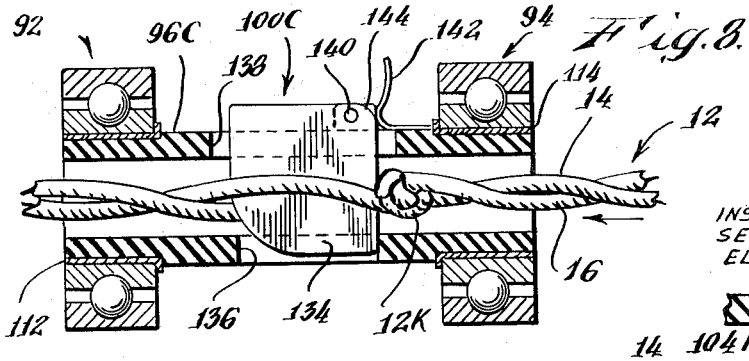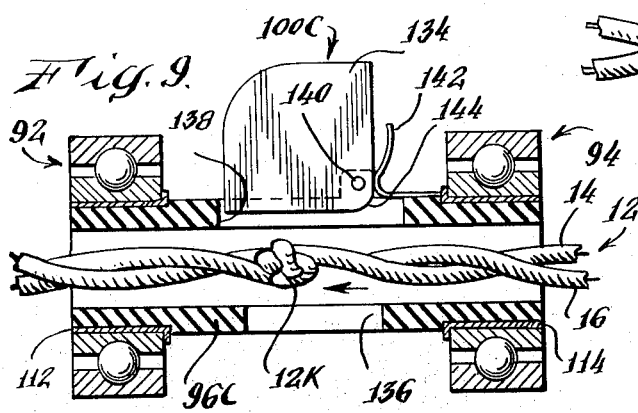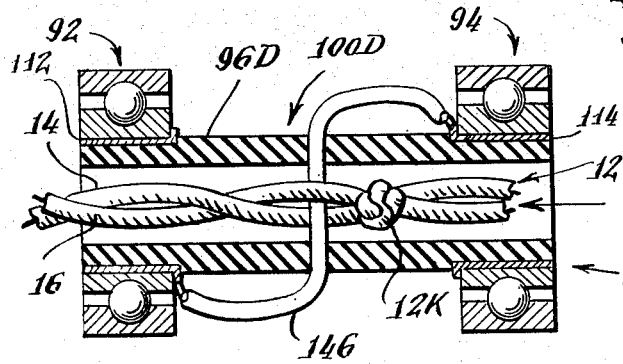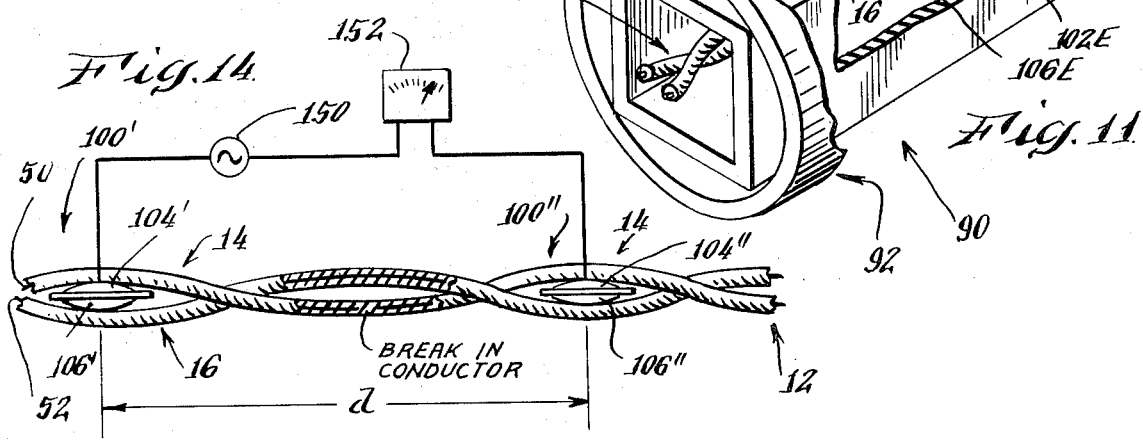

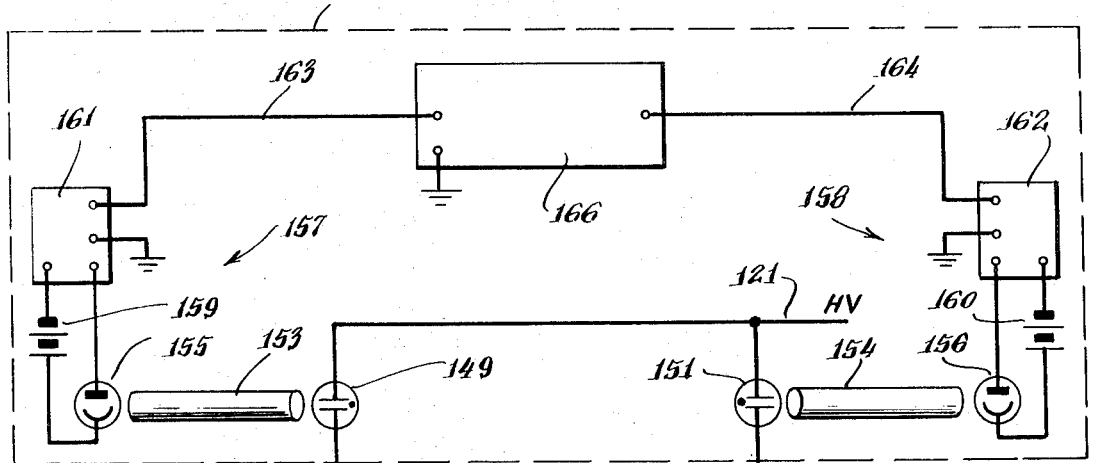
Fig. 15.
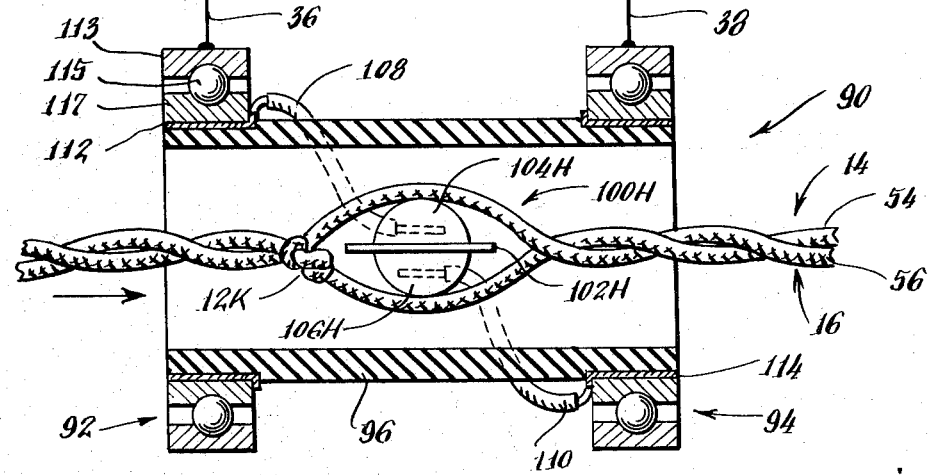
Fig. 16.
Fig. 17.
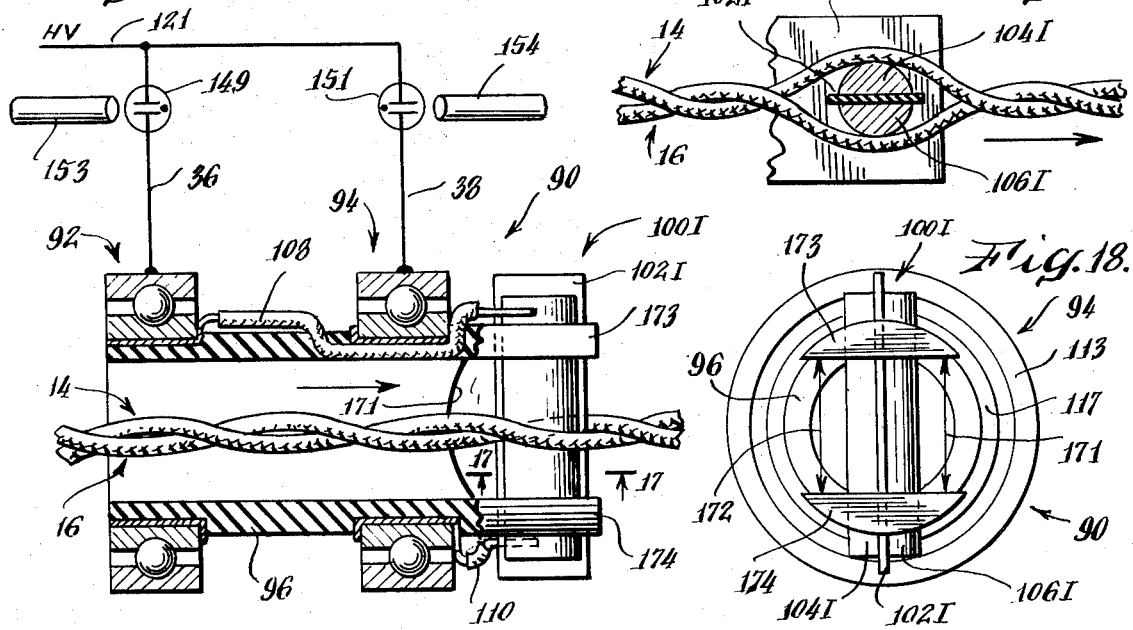
Fig. 18.

METHOD AND APPARATUS FOR TESTING TWISTED PAIR WIRE TO LOCATE ELECTRICAL INSULATION FAULTS OR MEASURE TWIST OR WIRE RUNOUT OR SENSE BREAKS IN THE CONDUCTORS

BACKGROUND OF THE INVENTION

1. Field of the invention

This invention relates to insulated wire test apparatus and test methods of the type in which a supply of wire is rapidly fed through the test apparatus to determine whether there are any faults in the wire, and more particularly, to a test apparatus and method capable of rapid and reliable testing of a twisted pair of individually insulated wires.

2. Description of the Prior Art

Heretofore, testing of twisted pair wire has been accomplished in the same manner as individual wires, i.e., by running it through a surrounding test electrode which supplies a test voltage to the insulation covering while the electrical conductor in the wire is grounded. Any fault in the insulation allows a current to flow between the surrounding test electrode and the grounded conductors, the current flow causing a suitable indication to be given or causing appropriate action to be taken.

Among the difficulties associated with such testing arrangements is the need to have the surrounding test electrode intimately contact the full circumference of the insulation sheath surrounding the wire to be sure that all of the insulation will be tested. Where twisted pair wire is concerned, it is clear that a surrounding electrode cannot contact the full circumference of each insulation sheath because the two insulation sheaths are themselves in contact. In prior art testing arrangements, therefore, testing reliability is low in the insulation regions lying between the conductors of the two wires, which is precisely where faults causing shorts occur. As a result, prior art testing arrangements have not served satisfactorily for testing twisted pair wire.

Twisted pair wire is in many cases used to connect telephones with the respective central switching installations. For this purpose the twisted pair wire carrying the messages from one telephone is bundled together in a cable with numerous other twisted wire pairs carrying messages from many other telephones. Typically, there are as many as approximately 500 or 1,000 twisted wire pairs in such a telephone cable. The prior art difficulty of accurately testing twisted wire pair has often led to problems with such telephone cable, because the faults in the insulation sheaths on the individual wires remain undetected, until after all of the 500 or 1,000 twisted wire pairs are bundled together. Then, the intimate bundling of the numerous twisted pair wires causes short circuits or interference from one telephone circuit to another to appear. Also, open circuits (broken wires) sometimes appear, but in many prior art cases the defects have not appeared until after the cable has been strung up on poles and swayed in the wind in use for a period of time. Such defects are difficult and expensive to locate after the telephone cable has been installed.

The present invention is intended to overcome many of these problems of the prior art by locating defects in insulation and open circuits (breaks) in conductors of twisted wire pairs before the twisted wire is bundled into cables.

SUMMARY OF THE INVENTION

Objects of the present invention are to provide methods and apparatus for reliably and quickly testing a twisted pair of individually insulated wires, with the capability of testing for a variety of commonly occuring faults, the testing apparatus and methods being respectively uncomplicated in construction and simple to perform.

The testing apparatus according to the invention comprises a housing or support member providing a passage along a feed axis for the twisted pair wire, and an electrode unit mounted in said support member for free rotation about said axis. The electrode unit includes a separating member lying on said axis and adapted to be fitted between the pair of twisted wires, the electrode unit freely rotating so that the separating member is able to follow the twist of said twisted pair as it is fed along said axis, the separating member thereby continuously remaining between the pair of twisted wires for separate individual testing thereof. Means are provided for making electrical contact with said electrode unit as it rotates to permit the electrode unit to be coupled to external testing circuitry.

The electrode unit may take several different forms. In one embodiment, the electrode unit comprises an insulating carrier mounting the separating member, which comprises a central insulating sheet and conductive members on each side of said sheet for contacting the individual wires of said twisted pair. The conductive members may have grooved surfaces to fit the circumference of the individual wires, or the conductive members may be tubular to surround the individual wires. In further embodiments, the separating member fitting between the twisted wires is arranged to move out of position if a kink or knot in the wire causes an obstruction. In another embodiment of the testing apparatus, means are provided for detecting rotation of the electrode unit, thereby to determine when the twisted pair wire has run out and rotation has stopped.

Testing systems according to the invention for testing twisted pair wires comprise means for feeding the wire along a feed axis past a testing station, a testing apparatus as described above at said testing station, said testing apparatus including a rotatable electrode unit with a separating member continuously remaining between the twisted pair of wires for individual testing thereof, and means coupled to said electrode unit for indicating selected electrical characteristics of the twisted pair wire fed through the testing station. In one testing system according to the invention, two testing apparatuses as described above are located at spaced axial locations along the twisted pair; with this arrangement, capacitance measurements through the two electrode units indicate an open circuit in the wire between the two testing apparatuses, and the degree of twist in the wire can be determined by relating the phase difference between the electrode units to the axial distance separating them.

The method of testing the electrical characteristics of twisted pair wire according to the invention comprises feeding the twisted pair wire along the feed axis past a testing station, providing an electrode unit at said testing station with a separating member lying on said axis and being freely rotatable, fitting said separating member between said twisted pair so it will follow the twist of said twisted pair as it is fed past said testing station, electrically contacting the electrode unit during rotation thereof, and indicating selected characteristics of the twisted pair wire fed past said testing station according to signals received from the electrode unit. The end of the twisted pair wire is indicated by detecting the cessation of motion of the electrode unit.

The various objects, aspects, and advantages of the present invention will be in part more fully pointed out and in part will be understood from the following description of illustrative embodiments of the invention, when considered in conjunction with the accompanying drawings.

DESCRIPTION OF THE DRAWINGS

FIG. 3 is an enlarged sectional view of testing apparatus according to the invention, taken for example on line 3—3 of FIG. 1;

FIG. 4 is an end view, with portions broken away and in section, looking toward the right side of FIG. 3;

FIG. 5 is a cross-section taken on line 5—5 of FIG. 3, omitting the testing apparatus housing and including a schematic illustration of testing circuitry;

FIGS. 6 and 7 illustrate modified electrode unit portions;

FIGS. 8 and 9 are cross-sectional views similar to FIG. 3, but omitting the testing apparatus housing and showing a releasable electrode unit in two different positions of use; FIG. 10 is a cross-sectional view similar to FIGS. 8 and 9 showing another rotatable electrode unit construction;

FIG. 11 is a perspective view of still another electrode unit arrangement;

FIGS. 12 and 13 are cross-sectional views of other electrode unit arrangements;

FIG. 14 is a schematic view of portions of the system shown in FIG. 2;

FIG. 15 is an illustration of a third system for testing twisted pair wire according to the invention, in which the sensing and control circuit components are advantageously isolated from the high voltage being used for test purposes. Also, in FIG. 15 the electrode assembly has a modified configuration;

FIG. 16 shows a modified rotatable electrode testing unit in a system similar to that of FIG. 15. In FIG. 16 the electrode means are located outboard from the two support bearings, being positioned downstream therefrom;

FIG. 17 is a partial sectional view of the electrode assembly of FIG. 16 taken on line 17—17; and FIG. 18 is an end elevational view of the rotatable electrode unit of FIG. 16, with the twisted wire omitted for clarity of illustration.

DESCRIPTION OF THE PREFERRED EMBODIMENTS

Figures 1, 2:
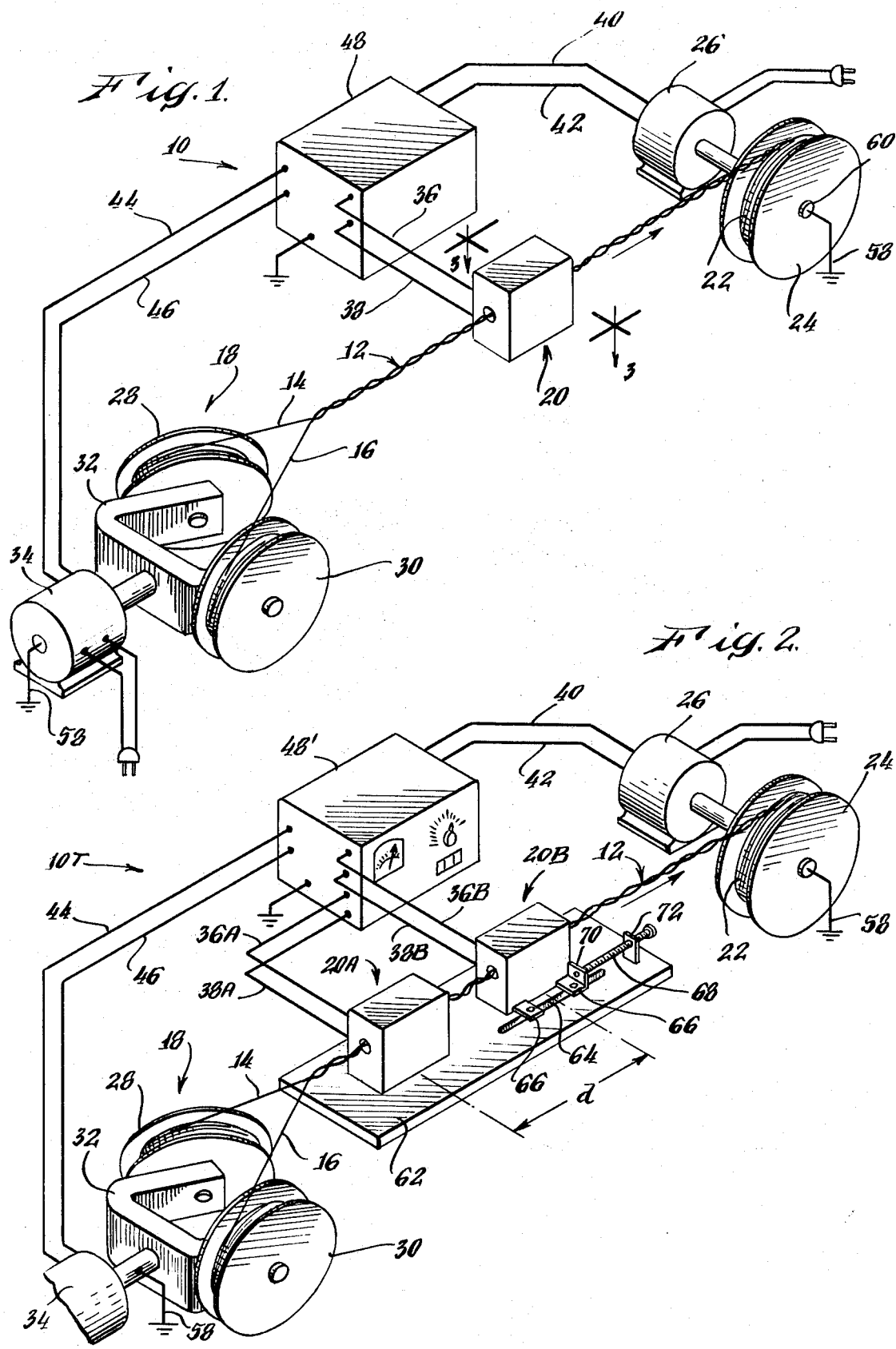
FIG. 1 is an illustration of a system for testing twisted pair wire according to the invention.
FIG. 2 is an illustration of a second system for testing twisted pair wire according to the invention.

FIG. 1 illustrates a system 10 for testing a twisted pair 12 of individually insulated wires 14, 16. As shown the twisted pair 12 is fed from a suitable supply mechanism 18, for example the illustrated wire twisting apparatus, and the twisted pair 12 is pulled through a test apparatus 20 to form a coil 22 on a take-up reel 24 driven by suitable motor means 26.

The supply mechanism 18 includes supply reels 28 and 30 for the individually insulated wires 14 and 16, the supply reels 28, 30 being mounted for free rotation about their hubs on a yoke 32 which in turn is rotated by a motor means 34 to twist together the individually insulated wires 14 and 16 to form the twisted pair 12. The testing apparatus 20 and motors 26 and 34 are connected by means of suitable conductors 36, 38; 40, 42; and 44, 46; respectively, to a testing circuit 48. The testing circuit 48 receives fault signals from testing apparatus 20 and is arranged to control motors 26 and 34 in response thereto and to provide suitable fault indications.

The individual insulated wires 14 and 16 include conductive cores 50, 52 and insulation coverings 54, 56 respectively (FIG. 3). For many types of fault testing the conductive cores 50, 52 are to be grounded, and the ground connection may be made at the take-up reel 24, as shown by ground connector 58 attached to the hub 60 of take-up reel 24, or the ground connection may be made at wire supply mechanism 18 or both at mechanism 18 and take-up reel 24, whatever arrangement is convenient.

FIG. 2 illustrates another testing system 10T according to the invention, in which parts in common with the system 10 described above are indicated by the same numerals. Testing system 10T feeds twisted pair 12 through two successive testing apparatuses 20A and 20B connected to testing circuit 48' by conductors 36A, 38A; and 36B, 38B. The testing apparatuses 20A and 20B are mounted so that their separation distance $d$ along the feed axis of twisted pair 12 can be varied. As shown, such variability can be provided by mounting testing apparatus 20A fixedly to a platform 62, and mounting testing apparatus 20B slidably to platform 62 by means of a slot 64 therein receiving guide members 66 fastened to the testing apparatus 20B. An adjustment screw 68 links bracket 70 on testing apparatus 20B and bracket 72 on platform 62 to control the position of apparatus 20B and its separation distance $d$ from apparatus 20A. As will be explained in greater detail below with reference to FIG. 14, testing system 10T is adapted to locate open circuits by making capacitance measurements on the section of twisted pair 12 between the two testing apparatus 20A and 20B, and is also adapted to measure the rate and number of twists and hence the length of twisted pair 12.

A testing apparatus 20 as employed in testing systems 10 and 10T and 10U is shown in FIGS. 3-5. As shown, the testing apparatus 20 comprises a two-part support member or housing 80 constructed of insulating material, each part of housing 80 being generally cup-shaped and being joined in rim-to-rim relationship by axially extending screws 86. Housing 80 has end openings 82 and 84 and a central cavity 88 providing a passage permitting the twisted pair wire 12 to be drawn therethrough along its feed axis. In central cavity 88 an electrode unit 90 is mounted on ball bearings 92 and 94 for free rotation about the feed axis of twisted wire pair 12.

As shown in FIGS. 3-5, electrode unit 90 comprises a tube 96, of transparent insulating material such as methyl methacrylate, e.g., "Lucite," having its ends within the inner races of bearings 92 and 94. Mounted centrally in rotatable tube 96 is an electrode assembly 100 which extends across the feed axis of twisted pair 12 and is arranged to fit between and to separate the individual insulated wires 14 and 16. Electrode assembly 100 together with is cylindrical support 96 freely rotates on its axis, following the twist of said twisted pair 12 as it is fed through testing apparatus 20, thus continuously remaining between the twisted pair of wires to permit individual testing thereof.

Electrode assembly 100, as illustrated in FIGS. 3–5, comprises a central insulating sheet element 102, for example of Delrin, between conductive members 104, 106, for example of chromed steel to resist wear, which are in contact with the insulation of the individual wires 14 and 16 of said twisted pair 12. As shown in FIG. 3, insulating sheet 102 extends beyond the edges of conductive members 104, 106 by a small distance, for example, one eighth inch. Conductive members 104, 106 have the shape of cylindrical segments, their curved outer surfaces being in contact with the wires 14, 16 and providing smooth sliding reliable contact with the moving wires over a substantial length thereof. It will be observed that as the electrode assembly 100 and tube 96 rotate, the surfaces of conductive members 104, 106 will pass in a generally helical sliding and wiping relative motion along and around the circumference and along the length of wires 14, 16 to effectively contact the surface of the insulation coatings 54 and 56 for thorough testing thereof.

In operation, as shown in FIG. 5, a high voltage test potential ("H.V.") of the desired potential is applied through a lead 121 to the conductive members 104 and 106. A fault in either insulation covering 54 or 56 allows this H.V. potential to establish current flow therethrough to the respective conductor cores 50 or 52 as a result of the potential applied through the lead 121. Thus, the insulation covering on each wire is individually being tested, while the testing of both occurs simultaneously.

In order to make electrical contact with rotating conductive electrode members 104, 106 to supply a potential and conduct current thereto, connector wires 108 and 110 are joined, as by soldering, to the respective electrode members and to the flanges of conductive flanged bushings 112 and 114 which are in contact with the inner races 117 of conductive bearings 92 and 94. The anti-friction ball elements 115 in the respective bearings provide an electrical circuit between the outer and inner races 113 and 117 of the bearings. Tap screws 116 and 118 in housing 80 make contact with the outer races 113 of bearings 92 and 94, and conductors 36 and 38 leading to testing circuit 48 are connected to tap screws, 116 and 118. Therefore, an electrical circuit is formed between conductor 36 and conductive electrode member 104, and another electrical circuit is formed between conductor 38 and conductive electrode member 106. By virtue of utilizing the ball bearing units 92 and 94 to complete the electrical circuits to the electrode members 104 and 106, there is an insignificant amount of frictional effect to be overcome, and thus the electrode unit 90 is freely rotatable to follow the twist of the twisted pair wire.

A "coincidence fault" as used herein means a fault occurring in the insulation coverings of both wires in a twisted pair at points which are close to each other such that there would be danger of short circuiting occurring between the conductive cores 50 and 52 if the faulted wire pair were to be bundled together with other pairs of wires in a cable and then placed in use. Such coincidence faults can be occassioned by pin holes or weak spots in the insulation as well as by gaps in the insulation exposing bare wire.

Use of testing apparatus 20 as a coincidence fault detector is shown schematically in FIG. 5. Conductors 36 and 38 are joined by a source of electrical power 120 in series with a relay winding 122. The conductor cores 50 and 52 of wires 14 and 16 are grounded at 58. When faults occur simultaneously in the insulation coverings of those portions of wire contacting conductive members 104 and 106, the H.V. potential will establish current flow from each of the electrode members 104 and 106 through the respective faults to the grounded conductive cores 54 and 56. Thus, a circuit is established from conductive member 104, to core 50, to ground, to core 52, to conductive member 106. A current then flows from the power supply 120 through a relay winding 122 to energize the relay which is arranged to actuate a warning bell and/or a signal light to give an indication of the coincidence fault. Also, the motors 26 and 34 may be automatically stopped when a fault occurs.

As explained above, the circuit of FIG. 5 is adapted for coincidence fault detection, because the fault sensing means 120, 122 is connected in series in circuit with both of the bearings 92 and 94 and with the two electrode members 104 and 106. If it is desired to test the insulation covering of each wire individually with or without respect to coincidence faults, then the circuit of FIG. 5 may be replaced by a circuit arrangement as shown in FIG. 15 in which a pair of fault sensing means are employed arranged in series with each of the bearings 92 and 94. In other words, fault sensing means may be included in each of the leads 36 and 38, and then the test circuit may be arranged to indicate a fault in the insulation covering of each individual wire 14 or 16 and/or coincidence faults may be indicated.

Testing apparatus 20 as illustrated in FIG. 3 can also be used to function as a runout detector, that is, a detector capable of determining when the supply of twisted pair wire 12 is exhausted or broken and is no longer being drawn through the testing apparatus 20. In order to accomplish this, testing apparatus 20 is arranged to sense rotation of the electrode unit 90, which rotates as long as twisted pair wire 12 is being drawn through it but stops rotating when the wire runs out or breaks. Motion of the electrode unit is detected by forming the conductive elements 104, 106 out of a magnetic material so that their rotation will produce a varying magnetic field. Pick-up coils 124, 126 are mounted in housing 80 to detect the varying field and induce a voltage according to Faraday's law. When the conductive members 104, 106 have stopped moving, the magnetic field does not vary, and no voltage is induced. Suitable circuits responsive to the induced voltage are employed to control motors 26 and 34 and to provide suitable indications that the runout condition exists. Also, the control circuits 40 and 42 and 44,46 serve to stop the motors 26 and 34 when a fault or "runout" occurs.

Alternatively, detection of rotation of electrode unit 90 can be accomplished by using a photocell and a light beam interrupted by the rotating electrode assembly 100. When a runout occurs the light beam is no longer interrupted or fluctuated, and the photocell circuit is arranged to give a signal when the light beam stops fluctuating.

As mentioned above, as conductive members 104 and 106 rotate, they also relatively travel helically circumferentially about the individual wires 14 and 16. FIGS. 6 and 7 illustrate modified electrode assemblies 100A and 100B to provide improved circumferential contact of the wires 14 and 16. As shown in FIG. 6, electrode assembly 100A has conductive members 104A and 106A which are each provided with a groove 130 extending across their curved outer surfaces so as to receive the individual wires 14, 16 and contact a substantial circumferential region thereof. The grooves 130 have a cross-section corresponding to the wire cross-section to provide close contact. In order to follow the natural twisting path of the wires 14, 16, the grooves 130 are not straight but are curved or helically formed to match the twist of the wires.

The electrode assembly 100B shown in FIG. 7 has, on either side of insulating sheet 102, conductive members 104B and 106B which are tubular and through which the wires 14 and 16 extend. The tubular conductive members 104B and 106B extend completely around the circumference of the wires 14, 16, and follow the twist of the wires to provide a free path therefor.

FIGS. 8 through 10 illustrate electrode units adapted to release when the twisted pair 12 contains a knot or kink 12K preventing smooth feeding of the twisted pair 12. The electrode assembly 100C illustrated in FIGS. 8 and 9 includes a conductive member 134 which fits between wires 14, 16 and is pivotally mounted in slots 136, 138 in insulating tube 96C by means of pivot pin 140 located at the wall of tube 96C, laterally of the feed axis of the twisted pair 12. A spring 142 resiliently pushes against the corner 144 of the conductive member 134 in a counter-clockwise direction to hold it in operating position (FIG. 8) while the twisted pair wire 12 is fed therethrough. When a knot or kink 12K contacts conductive member 134, it pivots out of the way (FIG. 9) against the resistance of spring 142 to permit the knot to pass.

The spring 142 may serve to provide an electrical connection between the electrode member 134 and the bushing 114 associated with the bearing 94. Thus, by applying a high test voltage to the bearing 94 associated with fault sensing means as shown in FIG. 15 a fault in the insulation covering of either wire may be sensed.

Alternatively in FIGS. 8 and 9, for sensing an individual fault in the insulation of either wire and/or coincidence faults, the electrode assembly 100 (FIGS. 3-5) or 100A (FIG. 6) or 100F (FIG. 12) or 100H (FIG. 15) or 100I (FIGS. 16-18) can be used in lieu of the conductive member 134. The insulating divider 102, 102A, 102F, 102H, or 102I, of the electrode assembly 100, 100A, 100F, 100H or 100I is pivotally mounted at 140, and the spring 142 serves to press against the corner of this insulating member to hold such electrode assembly in operating position. Flexible wires, such as those shown at 108 and 110, ar then connected between the respective bushings 112 and 114 in FIG. 8 and the respective electrode members 104, 106 or 104A, 106A or 104F, 106F or 104H, 106H or 104I, 106I as the case may be. Two sensing means are then employed in circuit with the respective bearings 92 and 94 in FIG. 8.

In order to indicate in FIGS. 8 and 9 that a knot or kink 12K has occurred, rotary sensing means, such as coils 124, 126 or a light source and photocell, are placed in the support housing 80 (FIGS. 3 and 4) at a position with respect to the cylindrical element 96C so as to avoid being struck by the displaced electrode assembly. Thus, when the electrode assembly 100C (or 100, 100A, 100F, 100H or 100I) is in its normal operating position as shown in FIG. 8 such rotary sensing means provides a fluctuating signal to indicate that the cylindrical element 96C is rotating. However, when a knot or kink has knocked such electrode assembly radially outward to the displaced position indicated in FIG. 9, then rotation stops, and the rotary sensing means gives a warning that a knot or kink has occurred.

FIG. 10 illustrates an electrode assembly 100D which is formed from a replaceable wire 146 fitting between wires 14, 16 and having a predetermined breaking strength which is low enough to cause the wire 146 to break when a knot or kink 12K obstructs the passage of the twisted pair wire. When the wire 146 is broken, a new length is inserted to replace it. The wire 146 is bare and thus serves as a conductive electrode member for individually and simultaneously testing the insulation of each wire 14 and 16. Circuit continuity sensing means such as a power source 120 and a relay 122 may be connected between the bearings 92 and 94 in FIG. 10. Thus, when the electrode wire 146 is broken, the circuit continuity is opened between bearings 92 and 94, and the relay actuates warning means to indicate that a knot or kink 12K has been sensed.

FIGS. 11 through 13 illustrate further variations in construction of the electrode assembly. Electrode assembly 100E illustrated in FIG. 11 comprises a central insulator 102E having a cross-section with outwardly curved upper and lower surfaces and fitting between the individual wires 14, 16. Conductive roller members 104E, 106E contact the wires 14, 16 respectively on the outside portions thereof. The conductive roller members 104E, 106E are mounted in a square walled insulating tube 96E either in fixed position or with spring-loading so as to push against the individual wires 14, 16 to insure intimate contact therewith. This tube 96E is mounted on a pair of ball bearings, one of which is shown at 92, so that the tube 96E can freely rotate about its longitudinal axis. It is to be understood that the roller electrodes 104E, 106E are connected to the respective bearings.

If the separator 102E (FIG. 11) is made conductive, then the test apparatus is suited for sensing faults in the insulation covering of either wire or coincidence faults, as described in connection with FIG. 13.

Electrode assembly 100F illustrated in FIG. 12 comprises a central insulating portion 102F having a cross-section with curved outer surfaces, receiving partially imbedded cylindrical conductive pin members 104F and 106F, which contact the inside surface of wires 14 and 16 and fit therebetween.

FIG. 13 illustrates an electrode assembly 100G having a central conductive portion 102G having curved outer surfaces and fitting between the individual wires 14 and 16, and external conductive rollers 104G and 106G in contact with the wires 14, 16. This arrangement is especially suited for detecting coincident bare or uninsulated wires, as the presence thereof will complete a circuit from conductive member 104G through conductive member 102G to conductive member 106G. At the same time flaws in only one conductor will complete a circuit from, e.g., conductor 104G to the core 50 of wire 14 which is grounded.

FIG. 14 illustrates schematically the operation of system 10T shown in FIG. 2. Testing apparatus 20A has an electrode assembly 100' and testing apparatus 20B has an electrode assembly 100'' with conductive members 104' and 104'' contacting individual wire 14 and conductive members 106' and 106'' contacting individual wire 16. Conductive members 104' and 104'', for example, are joined with a source of alternating current 150 and a capacitance meter 152. As the twisted pair 12 is fed through the two testing apparatuses, capacitance meter 152 will indicate the capacitance normally existing between conductive member 104' and core 50, in series with the capacitance between core 50 and conductive member 104''. If the core 50 should develop an open circuit, an additional capacitance will be introduced and detected if the open circuit lies in the portion of wire 14 which is between conductive member 104' and conductive member 104''. A similar arrangement will indicate an open circuit in wire 16. Thus an accurate indication of open circuit conditions is given together with an indication of where the open circuit condition exists, since it must be in the short portion of wire between the two successive testing apparatuses.

Testing system 10T also can be used to measure the amount of twist per unit length put into the twisted pair 12. This is done by measuring the phase angle between electrode assembly 100' and electrode assembly 100'' and by measuring the axial distance $d$ therebetween. The measurement can be simplified by adjusting the screw 72 until the electrode assemblies 100' and 100'' are parallel, thereby providing a phase angle which is a multiple of 180°.

The total length of wire being run is conveniently measured by counting the number of rotations of one of the test apparatus 20A or 20B. The total number of rotations divided by the amount of twist per foot gives the total length. For example, assume there are six twists per foot of wire length, and if the test apparatus 20A or 20B has rotated 18,000 rotations then, the total length of wire which has been drawn through the test system 10T is 18,000 divided by 6, giving an answer of 3,000 feet of twisted pair wire.

In FIG. 15 is shown a test system 10U in which the high voltage test potential is advantageously insolated from most of the fault sensing and control components of the testing system. There is a first fault sensing means 149 in circuit in series with the bearing 92 and a second fault sensing means 151 in circuit in series with the other bearing 94. These fault sensing means 149 and 151 are light-emitting diodes each associated with electrically insulating light-conducting means 153 and 154 for transmitting light from the respective diodes to a pair of photocells 155 and 156. The electrically insulating light-conducting means 153 and 154 serve to isolate the remainder of the test circuit 48 or 48' from the H.V. potential being applied from the lead 121 through the diodes 149 and 151 to the leads 36 and 38. These light-conducting means 153 and 154 may comprise rods each formed of a bundle of optical glass fibers or rods of methyl methacrylate, e.g. "Lucite" or "Plexiglas."

There are a plurality of fault detecting circuits 157 and 158 in the test and control circuit 48 or 48' each including a source of electrical power 159 and 160 connected in series with the photocell 155 or 156 to a trigger component 161 and 162. The trigger components 161 and 162 may be normally open relays or silicon controlled rectifiers (SCR's) or other trigger devices, which are connected through leads 163 and 164 to an AND/OR control circuit 166.

When a fault is present in either of the insulation coverings on the wires 14 or 16, then a current flows through the light-emitting diode 149 or 151 causing light to actuate the respective photocell 155 or 156. Actuation of photocell 155 or 156 allows current to flow from the source 159 or 160 so as to trigger the circuit 161 or 162, thus producing an electrical signal or pulse on the lead 163 or 164. The fault current flow path is from the H.V. lead 121 through the respective diode 149 or 151, through lead 36 or 38, through bearing 92 or 94 and through connection 108 or 110 to the respective conductive electrode member 104H or 106H and then through the insulation fault to the grounded conductor in the wire 14 or 16.

The light-emitting diodes 149 and 151 are current responsive, not voltage responsive. Thus, any incidental fluctuations (sometimes called electrical "noise") occuring in the voltage difference between the H.V. lead 121 and ground do not accidentally actuate the diodes 149 and 151. Such fluctuations or electrical noise can arise from many transient ambient conditions such as switching transients, starting and stopping of electrical motors, elevators, circuit breakers, electrical power transmission line phenomena, etc. In prior art test circuits which are voltage responsive such electrical noise can cause spurious indications of faults to occur. The diodes 149 and 151 being sensitive only to the flow of fault current avoid giving spurious indications of nonexistent faults.

The control circuit 166 can be set up as an OR circuit to be responsive to a signal on either the lead 163 or 164, thus indicating a fault in the insulation of either wire 14 or 16. If faults appeared simultaneously they would also be indicated by the OR circuit 166.

If it is desired only to indicate coincidence faults, then the control circuit 166 is set up as an AND circuit so that it will only be responsive when electrical signals appear simultaneously on both the leads 163 and 164, thus showing a coincidence fault. The control circuit 166, whether AND or OR, is arranged to actuate warning signal devices such as bells or lights, and also serves to control the motors 26 and 34, as shown in FIGS. 1 or 2.

The electrode members 104H and 106H in electrode means 100H have a greater lateral thickness, i.e., they are convex outwardly and bulge out farther from the axis than some of the electrodes described above. This greater lateral electrode thickness as shown in FIG. 15, and also in FIG. 17, has the advantage that it separates the wires 14 and 16 somewhat farther apart and also father upstream and thus prevents a knot or kink 12K from snagging on the leading edge of the insulating separator member 102H within the rotating electrode unit 90.

In FIG. 16 a modified rotating electrode unit is shown in a test system similar to that illustrated in FIG. 15. The electrode assembly 100I includes hardened steel electrodes 104I and 106I. This electrode means 100I is positioned outboard from the support bearings 92 and 94 for the rotatable electrode unit 90. Its tubular member 96 is cut away on opposite sides to form large clearance openings or slots 171 and 172. These openings 171 and 172 leave a pair of spaced portions or legs 173 and 174 extending downstream from the main body of the rotating tubular member 96. The opposite ends of the electrode assembly 100I are held by the support legs 173 and 174.

It is an advantage of the modified rotatable electrode unit 90 of FIGS. 16-18 that the enlarged openings 171 and 173 on opposite sides of the tubular member 96 in the vicinity of the electrode assembly 100I provide clearance such that two relatively large knots or kinks can simultaneously pass by on opposite sides of the electrode means 100I without snagging or catching.

Also, positioning of the electrode means 100I near one end of the rotatable member 96 results in greater accessibility of the electrode means 100I and of the connections 108 and 110 thereto. The electrode means 100I can thereby be located near one end of the housing 80 (FIG. 3) for the bearings 92 and 94. If desired, the two insulating legs 173 and 174 and the electrode means 100I can be arranged to project out from one end of the housing 80 so that they are readily accessible. In such arrangement the rotary motion sensor means are mounted on brackets extending from the same end of the housing as the electrode means 100I.

If desired, one or more magnetic or opaque elements can be secured to the wall of the rotatable tubular member 96 for actuating the rotary motion sensor means 124, 126 rather than using the electrode means to produce such actuation.

As used herein the terms "ground" or "electrically grounding" mean to establish a conductive path from a conductive element to one side of a high voltage potential source. This one side is usually at a low or zero potential relative to the potential of the earth and so it is often called the "ground" side of the high voltage test source, as distinguished from the other side which is usually at a high potential relative to the earth and is often called the high voltage (H.V.) side.

From the foregoing it will be understood that the present invention as described above is well suited to provide the advantages set forth and that many possible embodiments may be made of the various features of this invention all without parting from the scope of the invention as defined in the following claims. It is to be understood that all matter hereinbefore set forth are shown in the accompanying drawings is to be interpreted as illustrative and not in a limiting sense and that in certain instances some of the features of the invention may be used without a corresponding use of other features or may be modified into equivalent elements.

I claim:

1. The method of testing the electrical characteristics of a length of previously twisted pair of wires each including an electrically conductive core covered by an insulation covering comprising the steps of:

feeding said previously twisted pair of wires along an axis through a testing station, positioning a member between the wires of the previously twisted pair, rotatably mounting said member for free rotation about said axis so as to allow said member to follow the twists of said previously twisted pair of wires passing through said station, holding the freely rotatable member in the station continuously between the wires of the previously twisted pair as they are fed through said testing station to cause said member to be rotated by the passage of said previously twisted pair for individual testing thereof, and sensing a selected electrical characteristic of portions of the twisted pair of wires as they are fed along said axis past said rotating member as it is being rotated by the passage of said previously twisted pair of wires.

2. The method for individually testing the electrical characteristics of a length of previously twisted pair of wires each including an electrically conductive core covered by an insulation covering as claimed in claim 1, including the steps of:

electrically grounding both of the conductive cores, and, applying a high voltage test potential to said member while it is rotating for applying said high voltage test potential to the insulation coverings of each wire for sensing faults in the insulation covering of each of the wires of said previously twisted pair.

3. The method for individually testing the electrical characteristics of a length of previously twisted pair of wires each including an electrically conductive core covered by an insulation covering as claimed in claim 1, including the steps of:

sensing the rotary motion of said member, and providing an indication when said rotary motion stops to indicate runout or breakage in the previously twisted pair of wires.

4. The method for individually testing the electrical characteristics of a length of previously twisted pair of wires each including an electrically conductive core covered by an insulation covering as claimed in claim 1, including the steps of:

sensing the number of twists in the pair of twisted wires per unit length, and counting the number of rotations of said member for determining the number of units of length of said pair.

5. The method for individually testing the electrical characteristics of a length of previously twisted pair of wires each including an electrically conductive core covered by an insulation covering comprising the steps of:

feeding said previously twisted pair of wires along an axis through a testing station, positioning a freely rotatable member between the wires of the previously twisted pair so as to freely rotate about said axis, said freely rotatable member including a pair of laterally spaced conductive electrodes separated by an insulator, holding the freely rotatable member in the station continuously between the wires of the twisted pair as they are fed through said testing station to follow the twist of said previously twisted pair for individual testing thereof, electrically gounding the conductive cores of both wires, positioning said rotatable member with one of said conductive electrodes adjacent to the insulation covering on one wire of the twisted pair and with the other of said conductive electrodes adjacent to the insulation covering on the other wire of the twisted pair, applying a high voltage test potential to each of said electrodes while said member is rotating for applying the high voltage test potential individually to the insulation coverings, and sensing the flow of current between said high voltage test potential and either of said electrodes for individually indicating flaws in the insulation covering of either wire of the twisted pair.

6. The method for individually testing the electrical characteristics of a length of previously twisted pair of wires each including an electrically conductive core covered by an insulation covering, as claimed in claim 5, including the steps of:
sensing the simultaneous flow of current between said high voltage test potential and both of said electrodes for detecting coincidence faults in the insulation coverings on both wires of the twisted pair.

7. The method for individually testing the electrical characteristics of a length of previously twisted pair of wires each including an electrically conductive core covered by an insulation covering, as claimed in claim 5 in which:
said flow of current is sensed by providing for the emission of light when current flow occurs and the indicating of flaws is provided by a remote response to such light,
whereby the step of indicating flaws is isolated from the high voltage test potential being applied.

8. The method for individually testing the electrical characteristics of a length of twisted pair of wires each including an electrically conductive core covered by an insulating covering, comprising the steps of:
feeding said twisted pair of wires along an axis through first and second testing stations which are spaced along said axis,
positioning first and second freely rotatable members in said respective stations between the wires of the twisted pair so said first and second members can freely rotate about said axis,
holding said first and second freely rotatable members in said respective stations continuously between the wires of the twisted pair as they are fed through said stations in sequence to allow each of said members to follow the twist of said twisted pair, and
sensing the characteristics of the section of the twisted pair of wires extending between said first and second freely rotating members.

9. The method for individually testing the electrical characteristics of a length of twisted pair of wires each including an electrically conductive core covered by an insulating covering, as claimed in claim 8, in which:
the relative angular positions of said first and second freely rotatable members are sensed to determine the amount of twist per unit length, and
the number of rotations of one of said members is counted to determine the number of units of length of said twisted pair.

10. The method for individually testing the electrical characteristics of a length of twisted pair of wires each including an electrically conductive core covered by an insulating covering, as claimed in claim 8, in which:
each of said first and second freely rotatable members includes a pair of laterally spaced conductive electrodes separated by insulation, and including the steps of:
positioning each of said rotatable members with a first of said conductive electrodes adjacent to the insulation covering on a first wire of the twisted pair in each station and with the second of said conductive electrodes adjacent to the insulation covering on the second wire of the twisted pair in each station,
sensing the capacitance between each of said first electrodes and the conductive core of the first wire in series for detecting an open circuit in the conductive core of the first wire, and
sensing the capacitance between each of said second electrodes and the conductive core of the second wire in series for detecting an open circuit in the conductive core of the second wire.

11. Apparatus for testing the electrical characteristics of a length of previously twisted pair wire wherein each wire has a conductive core with an insulation covering thereon comprising:
rotatable means providing a path for the twisted pair wire to be moved along a feed axis;
bearing means for said rotatable means enabling said rotatable means to be freely rotatable about said feed axis,
electrode means mounted in said rotatable means including a member extending across said axis adapted to have the wires of the twisted pair pass on opposite sides thereof, whereby said rotatable means can freely rotate to permit said member to follow the twist of the twisted pair wire,
means for providing electrical connection from a testing circuit to said electrode means during rotation thereof for testing and characteristics of said twisted pair wire, and
said means for providing electrical connection to said electrode means during rotation thereof including a connection from said electrode means to said bearing means and an external connection to said bearing means,
whereby said bearing means completes a low friction electrical circuit from said electrode means to an external connection.

12. Apparatus for testing the electrical characteristics of a length of twisted pair wire wherein each wire has a conductive core with an insulation covering thereon, comprising:
rotatable means providing a path for the twisted pair wire to be moved along a feed axis;
bearing means for said rotatable means enabling said rotatable means to be freely rotatable about said feed axis,
electrode means mounted in said rotatable means including a member extending across said axis adapted to have the wires of the twisted pair pass on opposite sides thereof, whereby said rotatable means can freely rotate to permit said member to follow the twist of the twisted pair wire,
means for providing electrical connection to said electrode means during rotation thereof for testing the characteristics of said twisted pair wire,
said electrode means including an insulating member extending across said axis with a pair of conductive electrodes positioned on oppsoite sides of said insulating member,
one of said electrodes being positioned for engaging the insulation covering on one wire and the other of said electrodes being positioned for engaging the insulation covering on the other wire, and
said means for providing electrical connection to said electrode means including individual circuit connections to each of said electrodes.

13. Apparatus for testing the electrical characteristics of a length of twisted pair wire wherein each wire has a conductive core with an insulation covering thereon, as claimed in claim 12, in which:
said bearing means include a pair of ball bearing units axially spaced for supporting said rotatable means, each of said ball bearing units including a stationery race and a rotatable race connected to said rotatable means with a plurality of balls between said races providing for free rotation of said rotatable means, and
the individual circuit connections to said electrodes include connections from the respective electrodes to the respective rotatable races of said bearing units, with individual external connections to the respective stationery races.

14. Apparatus for testing the electrical characteristics of a length of twisted pair wire wherein each wire has a conductive core with an insulation covering thereon, as claimed in claim 12, in which:
said conductive electrodes are rollers spaced outwardly from opposite sides of said insulating member.

15. Apparatus for testing the electrical characteristics of a length of twisted pair wire wherein each wire has a conductive core with an insulation covering thereon, as claimed in claim 12, in which:
said conductive electrodes are adjacent to opposite sides of said insulating member,
said conductive electrodes are formed of hardened material to resist wear, and
said conductive electrodes have curved convex outer surfaces engaging th insulating covering on the respective wires for separating the twisted wire pair to pass on opposite sides of said electrode means.

16. Apparatus for testing the electrical characteristics of a length of twisted pair wire wherein each wire has a conductive core with an insulation covering thereon, as claimed in claim 15, in which:
said conductive electrodes have grooves in their outer surfaces conforming to the insulation covering on the wires for increasing the extent of circumferential contact between the respective insulation coverings and the respective electrodes.

17. Apparatus for testing the electrical characteristics of a length of twisted pair wire wherein each wire has a conductive core with an insulation covering thereon, as claimed in claim 13, in which:
said rotatable means extends outboard from both of said ball bearing units, and
said electrode means is mounted in the outboard extending portion of said rotatable means.

18. Apparatus for testing the electrical characteristics of a length of twisted pair wire wherein each wire has a conductive core with an insulation covering thereon, as claimed in claim 17, in which:
said outboard portion of said rotatable means includes clearance openings on opposite sides of said electrode means for allowing relatively large knots or kinks in both wires of the twisted pair to pass simultaneously by opposite sides of said electrode means.

19. A system for high voltage testing a previously twisted pair wire to test the insulation covering on the individual wire comprising:
rotatable means defining a path for the twisted pair wire to be moved along a feed axis,
bearing means supporting said rotatable means for free rotation thereof about said feed axis for said rotatable means to follow the twist of the twisted pair wire being moved along said feed axis,
separating means mounted in said rotatable means and positioned on said axis adapted to have the individual wires of the twisted wire pair pass on opposite sides of said separating means,
conductive electrode means in said rotatable means associated with said separating means for the insulation covering on the individual wire to pass adjacent to said electrode means,
electrical connection means for making electrical connection from a high voltage source of test potential to said electrode means while the twisted pair wire is being moved along said feed axis during rotation of said rotatable means,
said means for making electrical connection including light-emitting means for emitting light in response to the flow of current occurring when a fault in the insulation covering passes said electrode means, and
fault indicating means including photocell means positioned remote from said light-emitting means and arranged to be responsive to the emissions of light therefrom,
whereby said fault indicating means is isolated from the high voltage test potential in said electrical connection means.

20. Apparatus for testing the electricl characteristics of twisted pair wire in which each wire of the twisted pair has a conductive core with an insulation covering thereon comprising:
a support member defining a test station through which the twisted pair wire can be passed along a feed axis,
bearing means mounted on said support member adapted for rotation about said axis,
an electrode unit rotatably mounted by said bearing means in said support member for free rotation about said feed axis,
said electrode unit including separating means lying on said axis and arranged to fit between the respective wires of the twisted pair and to freely rotate about said axis for said separating means to follow the twist of said twisted pair as it is fed through said testing apparatus, thereby to remain continuously between the twisted pair of wires for enabling separate individual testing thereof;
means for making electrical connection with said electrode unit during rotation thereof,
said separating means comprising a central insulating element and conductive members positioned on each side of said insulating element for said conductive members to engage the respective insulation coverings of the individual wires of said twisted pair, and
said means for making electrical connection including means for making a connection to each of said conductive members.

21. Apparatus for testing the electrical characteristics of twisted pair wire as claimed in claim 20 wherein said electrode unit comprises a tubular insulating member carrying said separating means, said tubular insulating member being concentric with said feed axis and rotating about said axis along with said separating means.

22. Apparatus for testing the electrical characteristics of twisted pair wire as claimed in claim 20 wherein said separating means comprises a central insulating element and conductive members on each side of said element for contacting the individual wires of said twisted pair, said conductive members having grooves receiving said individual wires for contacting an extended circumferential region thereof.

23. Apparatus for testing the electrical characteristics of twisted pair wire as claimed in claim 20 wherein said separating means comprises an insulating element and conductive members on each side of said element for contacting the individual wires of said twisted pair, said conductive members comprising tubes through which the individual wires of the twisted pair extend.

24. Apparatus for testing the electrical characteristics of a length of twisted pair wire as claimed in claim 20 wherein said separating means are arranged to release for moving out of position with respect to said feed axis whenever an obstruction such as a knot or kink is encountered in said twisted pair.

25. Apparatus for testing the electrical characteristics of twisted pair wire as claimed in claim 24 wherein said separating means are pivotally mounted in said rotatable electrode unit for pivoting from an operating position on said feed axis to a retracted position spaced away from said feed axis when contacted by an obstruction in said twisted pair wire.

26. Apparatus for testing the electrical characteristics of twisted pair wire as claimed in claim 24 wherein said separating means comprises material with a predetermined breaking strength extending across said axis and adapted for breaking when contacted by an obstruction in said twisted pair wire.

27. Apparatus for testing the electrical characteristics of twisted pair wire as claimed in claim 20 wherein said separating means comprises an insulating body adapted to be positioned between the respective wires of the twisted pair and wherein said pair of conductive members are spaced away from opposite sides of said insulating body in contact with the insulation coverings of said individual wires.

28. Apparatus for testing the electrical characteristics of twisted pair wire as claimed in Claim 20, wherein said conductive members have a curved convex configuration for contacting the insulation coverings of the respective individual wires of said twisted pair for substantially separating the respective wires upstream from said insulating element for preventing any knot or kink from snagging on said insulating element.

29. Apparatus for testing the electrical characteristics of twisted pair wire as claimed in claim 2 wherein said separating means comprises a conductive body adapted to be positioned between the respective wires of the twisted pair and wherein said electrode unit further comprises a pair of conductive members spaced away from opposite sides of said conductive body in contact with the insulation coverings of said individual wires and located externally thereof with respect to said conductive body.

30. Apparatus for testing the electrical characteristics of twisted pair wire as claimed in claim 20 wherein said means for making electrical connection with said electrode unit during rotation thereof comprises conductive bearing means rotatably mounting said electrode unit, and means in said electrode unit for making electrical connection between said separating means and said bearing means.

31. A system for testing the electrical characteristics of twisted pair wire wherein each wire of the twisted pair has a conductor therein with an insulation covering on the conductor, comprising:
means for feeding the twisted pair wire along a feed axis through a testing station;
testing apparatus in said testing station, said testing apparatus comprising a rotatable electrode unit including separating means arranged to fit between the respective wires of the twisted pair and to freely rotate about said feed axis, thereby to follow the twist of said twisted pair as it is fed through said testing station and to continuously remain between the respective wires of the twisted pair, and having electrode means for individual testing thereof; and
means electrically coupled to said electrode means for indicating selected electrical characteristics of the twisted pair wire fed through said testing apparatus.

32. A system for testing the electrical characteristics of twisted pair wire as claimed in claim 31 wherein said testing apparatus comprises a support member and bearing means for rotatably mounting said electrode unit, said electrode unit includes a tubular insulating member concentrically mounted with respect to said feed axis for rotation about said axis, and said separating means being carried by said tubular insulating member.

33. A system for testing the electrical characteristics of twisted pair wire as claimed in claim 31 further comprising a second testing apparatus axially spaced from the first testing apparatus and located in a second testing station and comprising a second rotatable electrode unit including second separating means arranged to fit between the respective wires of the twisted pair and to freely rotate about said feed axis, thereby to follow the twist of the twisted pair as it is fed past said separating means, said second testing apparatus being electrically coupled to said indicating means.

34. A system for testing the electrical characteristics of twisted pair wire as claimed in claim 33 wherein siad indicating means includes means for measuring the capacitance in the section of the individual wires between said two testing stations.

35. A system for testing the electrical characteristics of twisted pair wire as claimed in claim 33 further comprising means for varying the axial spacing between said first and second test apparatus, thereby to facilitate measurement of the rate of twist in said twisted pair by permitting said first and second separating means to be brought into parallel relationship.

36. A system for testing the electrical characteristics of twisted pair wire as claimed in claim 35 further comprising
means for measuring the phase relationship of the rotation of said two separating means in relation to the axial distance by which they are spaced apart for measuring the rate of twist of said twisted pair wire.

* * * * *